(12) United States Patent
Krull et al.

(10) Patent No.: US 6,281,292 B1
(45) Date of Patent: Aug. 28, 2001

(54) MIXTURES OF COPOLYMERS HAVING AN IMPROVED LUBRICATING ACTION

(75) Inventors: Matthias Krull, Oberhausen; Werner Reimann, Frankfurt; Markus Kupetz, Dinslaken, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/320,230

(22) Filed: May 26, 1999

(30) Foreign Application Priority Data

May 27, 1998 (DE) .............................................. 198 23 565

(51) Int. Cl.$^7$ .............................. C08L 33/06; C08L 33/14
(52) U.S. Cl. ......................... 525/223; 525/240; 524/523; 524/524; 524/536
(58) Field of Search ..................................... 524/523, 524, 524/536, 558; 525/223, 240

(56) References Cited

U.S. PATENT DOCUMENTS

| | | |
|---|---|---|
| 3,621,004 | * 11/1971 | Eckert . |
| 4,015,063 | 3/1977 | Basalay et al. . |
| 4,906,682 | 3/1990 | Mueller et al. . |
| 4,985,048 | 1/1991 | Wirtz et al. . |
| 5,200,484 | 4/1993 | Reimann . |
| 5,254,652 | 10/1993 | Reimann et al. . |
| 5,767,190 | 6/1998 | Krull et al. . |
| 5,789,510 | 8/1998 | Krull et al. . |
| 5,858,028 | 1/1999 | Davies et al. . |

FOREIGN PATENT DOCUMENTS

| | | |
|---|---|---|
| 1271895 | 7/1990 | (CA) . |
| 1594417 | 5/1970 | (DE) . |
| 126090 | 6/1977 | (DE) . |
| 3443475 | 5/1986 | (DE) . |
| 19620118 | 10/1997 | (DE) . |
| 19620119 | 10/1997 | (DE) . |
| 0074208 | 3/1983 | (EP) . |
| 0153176 | 8/1985 | (EP) . |
| 0203554 | 12/1986 | (EP) . |
| 0254284 | 1/1988 | (EP) . |
| 0271738 | 6/1988 | (EP) . |
| 0320766 | 6/1989 | (EP) . |
| 0405270 | 1/1991 | (EP) . |
| 0463518 | 1/1992 | (EP) . |
| 0491225 | 6/1992 | (EP) . |
| 0493769 | 7/1992 | (EP) . |
| 0739970 | 10/1996 | (EP) . |
| WO 94/17160 | 8/1994 | (WO) . |
| WO 95/33805 | 12/1995 | (WO) . |
| WO 96/21709 | 7/1996 | (WO) . |

OTHER PUBLICATIONS

Derwent Abstract XP–002114871 & JP 61031445 A (SHOWA DENKO KK), Feb. 13, 1986.
Ullmanns Encyclopädie der Technischen Chemie [Ullmann's Encyclopedia of Industrial Chemistry], 4$^{th}$ Edition, vol. 19, pp. 169–178.
Comb–Like Polymers—Structure and Properties; N.A. Platé and V.P. Shibaev, J. Polym. Sci, Macromolecular Revs. 1974, 8, 117 ff.
D. Wei, H. Spikes, Wear, vol. 111, No. 2, p. 217, 1986.
Derwent Patent Family Report and/or Abstracts.
Derwent Abstract—EP 680506 (See G Above).
Derwent Abstract—EP 743974 (See F Above).
Chemical Abstracts, vol. 64 3267f.

* cited by examiner

*Primary Examiner*—Tae H. Yoon
(74) *Attorney, Agent, or Firm*—Susan S. Jackson; Scott E. Hanf

(57) ABSTRACT

The invention relates to mixtures comprising
A) from 10 to 90% by weight of at least one copolymer comprising structural units derived from ethylene and structural units derived from olefinically unsaturated, hydroxyl-containing compounds, and
B) from 90 to 10% by weight of at least one copolymer comprising structural units derived from ethylene and structural units derived from vinyl esters, olefinically unsaturated ethers and/or acrylates.

32 Claims, No Drawings

MIXTURES OF COPOLYMERS HAVING AN IMPROVED LUBRICATING ACTION

The present invention relates to mixtures of oil-soluble copolymers of ethylene and further comonomers which contain one or more hydroxyl groups and copolymers of ethylene and ethylenically unsaturated compounds, and their use for improving the lubricity of fuel oils.

DESCRIPTION OF THE RELATED ART

Mineral oils and mineral oil distillates used as fuel oils generally contain 0.5% by weight or more of sulfur, which, on burning, causes the formation of sulfur dioxide. In order to reduce the resultant environmental pollution, the sulfur content of fuel oils is continually being reduced further. The EN 590 standard relating to diesel fuels currently prescribes a maximum sulfur content of 500 ppm in Germany. In Scandinavia, fuel oils containing less than 200 ppm and in exceptional cases less than 50 ppm of sulfur are already in use. These fuel oils are generally produced by hydrotreating the fractions obtained from the crude oil by distillation. However, the desulfurization also removes other substances which provide the fuel oils with a natural lubricating action. These substances include, inter alia, polyaromatic and polar compounds.

However, it has now been found that the friction- and wear-reducing properties of fuel oils worsen with increasing degree of desulfurization. These properties are frequently so poor that the fuel-lubricated materials, such as, for example, the distributor injection pumps of diesel engines, can be expected to exhibit signs of wear after only a short time. The further lowering of the 95% distillation point to below 370° C., in some cases to below 350° C. or 330° C., which has in the meantime been carried out in Scandinavia, further exacerbates this problem.

The prior art therefore describes attempts to solve this problem (so-called lubricity additives).

DD-126 090 discloses lubricity additives comprising copolymers of ethylene and unsaturated carboxylic esters, preferably vinyl acetate, which are added to the fuels in amounts of from 0.01 to 0.5% by weight.

EP-A-0 743 974 discloses additives which improve the lubricating action of fuel oils and which comprise mixtures of esters and copolymers of ethylene and vinyl acetate.

WO-95/33805 discloses the use of cold-flow improvers as lubricity enhancers.

EP-A-0 074 208 discloses middle and heavy distillates containing, as additives, copolymers of ethylene and alkoxylated acrylates or ethylene and vinyl esters of saturated and unsaturated carboxylic acids.

However, the lubricating action of the known additives is in many oils still unsatisfactory or very high amounts must be added in order to achieve satisfactory results. The object of the present invention was therefore to find additives which improve the lubricating action in middle distillates which have been substantially freed from sulfur and aromatic compounds and do so when used in extremely small amounts.

SUMMARY OF THE INVENTION

Surprisingly, it has been found that mixtures of copolymers which, besides ethylene, also contain hydroxyl-containing comonomers and copolymers consisting of ethylene and olefinically unsaturated esters or ethers exhibit the requisite properties.

The invention thus relates to mixtures comprising

A) from 10 to 90% by weight of at least one copolymer comprising structural units derived from ethylene and structural units derived from olefinically unsaturated, hydroxyl-containing compounds, and B) from 90 to 10% by weight of at least one copolymer comprising structural units derived from ethylene and structural units derived from vinyl esters, olefinically unsaturated ethers and/or (meth)acrylates.

The invention furthermore relates to fuel oils comprising the copolymer mixtures described.

The invention furthermore relates to a process for improving the lubricating action of fuel oils while simultaneously improving their cold-flow properties, which comprises adding the copolymer combinations described to the fuel oils.

The olefinically unsaturated compounds whose non-ethylenic structural units are derived from the further comonomers in component A) are preferably vinyl esters, acrylates, methacrylates, alkyl vinyl ethers and/or alkenes carrying hydroxyalkyl, hydroxyalkenyl, hydroxycycloalkyl or hydroxyaryl radicals. These radicals contain at least one hydroxyl group, which can be in any desired position of the radical, but is preferably at the chain end (ω-position).

DESCRIPTION OF THE PREFERRED EMBODIMENTS

The vinyl esters are preferably those of the formula 1

$$CH_2=CH-OCOR^1 \tag{1}$$

in which $R^1$ is $C_1$–$C_{30}$-hydroxyalkyl, preferably $C_1$–$C_{16}$-hydroxyalkyl, especially $C_2$–$C_{12}$-hydroxyalkyl, or $C_6$–$C_{30}$-hydroxyaryl. Suitable vinyl esters include 2-hydroxyethyl vinyl ester, α-hydroxypropyl vinyl ester, 3-hydroxypropyl vinyl ester and 4-hydroxybutyl vinyl ester.

The acrylates are preferably those of the formula 2

$$CH_2=CR^2-COOR^3 \tag{2}$$

in which $R^2$ is hydrogen or methyl, and $R^3$ is $C_1$–$C_{30}$-hydroxyalkyl, preferably $C_1$–$C_{16}$-hydroxyalkyl, especially $C_2$–$C_{12}$-hydroxyalkyl. Suitable acrylates include hydroxyethyl acrylate, 2-hydroxypropyl acrylate, 3-hydroxypropyl acrylate, hydroxyisopropyl acrylate, 4-hydroxybutyl acrylate, diethylene glycol monoacrylate and glycerol monoacrylate, and the corresponding esters of methacrylic acid.

The alkyl vinyl ethers are preferably compounds of the formula 3

$$CH_2=CH-OR^4 \tag{3}$$

in which $R^4$ is $C_1$–$C_{30}$-hydroxyalkyl, preferably $C_1$–$C_{16}$-hydroxyalkyl, especially $C_2$–$C_{12}$-hydroxyalkyl. Suitable alkyl vinyl ethers include 2-hydroxyethyl vinyl ether, hydroxypropyl vinyl ether, hexanediol monovinyl ether, 4-hydroxybutyl vinyl ether, diethylene glycol monovinyl ether and cyclohexanedimethanol monovinyl ether.

The alkenes are preferably monounsaturated hydroxyhydrocarbons having 3 to 30 carbon atoms, in particular 4 to 16 carbon atoms, especially 5 to 12 carbon atoms. Suitable alkenes include dimethylvinylcarbinol (=2-methyl-3-buten-2-ol), allyloxypropanediol, 2-butene-1,4-diol, 1-buten-3-ol, 3-buten-1-ol, 2-buten-1-ol, 1-penten-3-ol, 1-penten-4-ol, 2-methyl-3-buten-1-ol, 1-hexen-3-ol, 5-hexen-1-ol and 7-octene-1,2-diol.

The molar proportion of hydroxy-functionalized comonomers in the copolymer A) is preferably from 0.5 to 15%, in particular from 1 to 12%, especially from 1 to 8%. The OH number of the copolymer is preferably between 1 and 500 mg of KOH/g of polymer, in particular between 5 and 300 mg of KOH/g of polymer, especially between 10 and 200 mg of KOH/g of polymer.

Besides ethylene, the copolymers A) contain at least one comonomer containing hydroxyl groups. They may also contain further, for example one, two or three further, olefinically unsaturated comonomers. Examples of such olefinically unsaturated comonomers are vinyl esters, acrylic acid, methacrylic acid, acrylic esters, methacrylic esters, vinyl ethers and olefins. Particularly preferred vinyl esters are vinyl acetate, vinyl propionate and vinyl esters of neocarboxylic acids (Versatic acids) having 8, 9, 10, 11 or 12 carbon atoms. Particularly preferred acrylic and methacrylic esters are those with alcohols having 1 to 20 carbon atoms, in particular of methanol, ethanol, propanol, n-butanol, isobutanol and tert-butanol. Particularly preferred olefins are those having 3 to 10 carbon atoms, especially propene, isobutylene, diisobutylene, norbornene, 4-methyl-1-pentene and hexene. Particular preference is given to terpolymers of ethylene, a hydroxy-functionalized comonomer and either vinyl acetate or a vinyl ester of a neocarboxylic acid having 8 to 12 carbon atoms. If the copolymers contain a further comonomer, the molar proportion thereof is preferably up to 15%, in particular up to 12%.

The olefinically unsaturated compounds whose non-ethylenic structural units are derived from the further comonomers in component B) are preferably vinyl esters, acrylic esters, methacrylic esters and/or alkyl vinyl ethers.

The vinyl esters are preferably those of the formula 4

$$CH_2=CH-OCOR^1 \qquad (4)$$

in which $R^1$ is $C_1$–$C_{30}$-alkyl, preferably $C_1$–$C_{16}$-alkyl, especially $C_1$–$C_{12}$-alkyl.

In a further preferred embodiment, $R^1$ is a neoalkyl radical having 7 to 11 carbon atoms, in particular having 8, 9 or 10 carbon atoms. Suitable vinyl esters include vinyl acetate, vinyl propionate, 2-ethylhexyl vinyl ester, vinyl laurate, vinyl neononanoate, vinyl neodecanoate and vinyl neoundecanoate.

The acrylates are preferably those of the formula 5

$$CH_2=CR^2-COOR^3 \qquad (5)$$

in which $R^2$ is hydrogen or methyl, and $R^3$ is $C_1$–$C_{30}$-alkyl, preferably $C_1$–$C_{16}$-alkyl, especially $C_1$–$C_{12}$-alkyl. Suitable acrylates include methyl acrylate, methyl methacrylate, ethyl acrylate and 2-ethylhexyl acrylate, and the corresponding esters of methacrylic acid.

The alkyl vinyl ethers are preferably compounds of the formula 6

$$CH_2=CH-OR^4 \qquad (6)$$

in which $R^4$ is $C_1$–$C_{30}$-alkyl, preferably $C_1$–$C_{16}$-alkyl, especially $C_1$–$C_{12}$-alkyl.

The comonomer content in copolymer B is between 5 and 25 mol %, preferably between 7 and 20 mol %. Component B is preferably a so-called flow improver, which is frequently added to middle distillates in order to improve the cold-flow All properties. Particular mention should be made here of ethylene-vinyl acetate, ethylene-vinyl acetate-vinyl versatate, ethylene-vinyl propionate, ethylene-vinyl acetate-diisobutylene, ethylene-vinyl acetate-4-methylpentene and ethylene-vinyl acetate-isobutylene copolymers.

Copolymer B) can generally be any known copolymer or terpolymer or mixtures thereof which, taken alone, improves the cold-flow properties of mineral oils or mineral oil distillates. Examples of suitable copolymers and terpolymers which may be mentioned are:

ethylene-vinyl acetate copolymers containing 10–40% by weight of vinyl acetate and 60–90% by weight of ethylene;

the ethylene-vinyl acetate-hexene terpolymers disclosed in DE-A-34 43 475;

the ethylene-vinyl acetate-diisobutylene terpolymers described in EP-A-0 203 554;

the mixture of an ethylene-vinyl acetate-diisobutylene terpolymer and an ethylene-vinyl acetate copolymer disclosed in EP-A-0 254 284;

the mixtures of an ethylene-vinyl acetate copolymer and an ethylene-vinyl acetate-N-vinylpyrrolidone terpolymer disclosed in EP-A-0 405 270;

the ethylene-vinyl acetate-isobutyl vinyl ether terpolymers described in EP-A-0 463 518;

the copolymers of ethylene and vinyl alkyl carboxylates disclosed in EP-A-0 491 225;

the ethylene-vinyl acetate-vinyl neononanoate or vinyl neodecanoate terpolymers disclosed in EP-A-0 493 769, which, besides ethylene, contain 10–35% by weight of vinyl acetate and 1–25% by weight of the respective neo compound;

the terpolymers of ethylene, the vinyl ester of one or more aliphatic $C_2$–$C_{20}$-monocarboxylic acids and 4-methyl-1-pentene described in DE-C-196 20 118;

the terpolymers of ethylene, the vinyl ester of one or more aliphatic $C_2$–$C_{20}$-monocarboxylic acids and bicyclo[2.2.1]heptene disclosed in DE-C-196 20 119.

The contents of the abovementioned specifications are expressly incorporated herein by way of reference.

The melt viscosities of the copolymers A) and B) at 140° C. are, independently of one another, preferably below 10,000 mPas, in particular between 10 and 1000 mPas, especially between 15 and 500 mPas.

Copolymers A and B are prepared by known processes (cf. in this respect, for example, Ullmanns Encyclopädie der Technischen Chemie [Ullmann's Encyclopedia of Industrial Chemistry], 4th Edition, Vol. 19, pages 169 to 178). Suitable processes are polymerization in solution, in suspension or in the gas phase and high-pressure bulk polymerization. Preference is given to high-pressure bulk polymerization, which is carried out at pressures of from 50 to 400 MPa, preferably from 100 to 300 MPa, and at temperatures of from 50 to 350° C., preferably from 100 to 300° C. The reaction of the comonomers is started by initiators which form free radicals (free-radical chain initiators). This class of substances includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl) peroxydicarbonate, t-butyl permaleate, t-butyl perbenzoate, dicumyl peroxide, t-butyl cumyl peroxide, di(t-butyl) peroxide, 2,2'-azobis(2-methylpropanonitrile) and 2,2'-azobis(2-methylbutyronitrile). The initiators are employed individually or as a mixture of two or more substances in amounts of from 0.01 to 20% by weight, preferably from 0.05 to 10% by weight, based on the comonomer mixture.

The desired melt viscosity of the copolymers A) and B) is set for a given composition of the comonomer mixture by varying the reaction parameters pressure and temperature and if desired by adding moderators. Moderators which have proven successful are hydrogen, saturated and unsaturated hydrocarbons, for example propane, aldehydes, for example propionaldehyde, n-butyraldehyde and isobutyraldehyde, ketones, for example acetone, methyl ethyl ketone, methyl isobutyl ketone and cyclohexanone, and alcohols, for example butanol. Depending on the desired viscosity, the moderators are used in amounts of up to 20% by weight, preferably from 0.05 to 10% by weight, based on the comonomer mixture.

High-pressure bulk polymerization is carried out batchwise or continuously in known high-pressure reactors, for example autoclaves or tubular reactors. Tubular reactors have proven particularly successful. Solvents, such as aliphatic hydrocarbons or hydrocarbon mixtures, benzene or toluene, can be present in the reaction mixture, although the solvent-free procedure has proven particularly successful. In a preferred way of carrying out the polymerization, the mixture of the comonomers, the initiator and, if used, the moderator is fed to a tubular reactor via the reactor inlet and via one or more side branches; the comonomer streams can have different compositions (EP-B-0 271 738).

Suitable copolymers for use as component A) are likewise those containing structural units derived from ethylene and vinyl alcohol. Copolymers of this type can be prepared by partially or fully hydrolyzing a copolymer containing structural units derived from ethylene and vinyl acetate, for example vinyl acetate.

Likewise, copolymers derived from ethylene and monomers carrying glycidyl radicals, such as, for example, glycidyl (meth)acrylate or glycidyl allyl ether, can also be used in accordance with the invention after hydrolysis using water, alcohols, such as methanol or glycol, or amines, such as, for example, ammonia, methylamine, ethanolamine and diethanolamine.

The lubricating action of oils can furthermore be improved in the manner according to the invention by admixing them with ethylene copolymers containing alkoxylated acid groups. Examples of ethylene copolymers which are suitable for this purpose are those containing acrylic acid, methacrylic acid, itaconic acid, fumaric acid, maleic acid or maleic anhydride. In order to prepare an additive which improves the lubricating action of oils, these copolymers containing acid groups are alkoxylated on the acid groups using $C_1$- to $C_{10}$-alkylene oxides. Preferred alkylene oxides are ethylene oxide, propylene oxide and butylene oxides. The alkoxylation is preferably carried out using from 0.5 to 10 mol, in particular from 1 to 5 mol, especially from 1 to 2 mol, of alkylene oxide per mole of acid groups.

The copolymer mixtures according to the invention are added to mineral oils or mineral oil distillates in the form of solutions or dispersions comprising from 10 to 90% by weight, preferably from 20 to 80%, of the polymers. Suitable solvents or dispersion media are aliphatic and/or aromatic hydrocarbons or hydrocarbon mixtures, for example gasoline fractions, kerosene, decane, pentadecane, toluene, xylene, ethylbenzene or commercial solvent mixtures, such as solvent naphtha, ®Shellsol AB, ®Solvesso 150, ®Solvesso 200, ®Exxsol-, ®ISOPAR and Shellsol D products, and also alcohols, ethers and/or esters. Mineral oils and mineral oil distillates whose lubricating have been improved by the mixtures contain from 0.001 to 2% by weight, preferably from 0.005 to 0.5% by weight, of copolymers, based on the distillate.

Components A and B can be added to the oils as a mixture or separately from one another.

In order to prepare additive packages for specific problem solutions, the copolymer mixtures according to the invention can also be employed together with further oil-soluble co-additives which, even alone, improve the cold-flow properties and/or lubricating action of crude oils, lubricating oils or fuel oils. Examples of such co-additives are comb polymers and oil-soluble amphiphilic compounds.

In one embodiment of the invention, the copolymer mixtures according to the invention are used together with comb polymers. This is taken to mean polymers in which hydrocarbon radicals having at least 8 carbon atoms, in particular at least 10 carbon atoms, are bonded to a polymer backbone. These are preferably homopolymers whose alkyl side chains contain at least 8 and in particular at least 10 carbon atoms. In the case of copolymers, at least 20%, preferably at least 30%, of the monomers have side chains (cf. Comb-like Polymers—Structure and Properties; N.A. Platé and V.P. Shibaev, J. Polym. Sci. Macromolecular Revs. 1974, 8, 117 ff). Examples of suitable comb polymers are, for example, fumarate-vinyl acetate copolymers (cf. EP 0 153 176 A1), copolymers of a $C_6$— to $C_{24}$-α-olefin and an N—$C_6$— to $C_{22}$-alkylmaleimide (cf. EP 0 320 766), furthermore esterified olefin-maleic anhydride copolymers, polymers and copolymers of α-olefins and esterified copolymers of styrene and maleic anhydride.

Comb polymers can be described, for example, by the formula

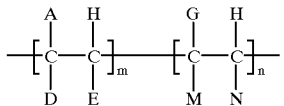

in which

A is R', COOR', OCOR', R"-COOR' or OR';

D is H, $CH_3$, A or R";

E is H or A;

G is H, R", R"—COOR', an aryl radical or a heterocyclic radical;

M is H, COOR", OCOR', OR' or COOH;

N is H, R", COOR", OCOR, COOH or an aryl radical;

R' is a hydrocarbon chain having 8 to 50 carbon atoms;

R" is a hydrocarbon chain having 1 to 10 carbon atoms;

m is a number between 0.4 and 1.0; and n is a number between 0 and 0.6.

The mixing ratio (in parts by weight) of the mixtures according to the invention with comb polymers is in each case from 1:10 to 20:1, preferably from 1:1 to 10:1.

In order to optimize the lubricating action, the copolymer mixtures according to the invention can be employed in the form of a mixture with further lubricity additives. Lubricity additives which have proven successful are preferably oil-soluble amphiphilic compounds, such as, for example, fatty alcohols, fatty acids and dimeric fatty acids, and esters and partial esters thereof with glycols (as described in DE-A-15 94 417), polyols, such as glycerol (as described in EP-A-0 680 506, EP-A-0 739 970) or hydroxylamines (as described in WO-96/21709).

The mixtures according to the invention are suitable for improving the lubricating and cold-flow properties of animal, vegetable or mineral oils and of alkanol-containing fuels. The amounts which need to be added are significantly lower than would be expected from the effectiveness of the individual components. Since polymers B are generally added to these oils in order to improve the cold-flow properties, the use of the mixtures according to the invention greatly reduces the amount of component B that needs to be added to achieve a satisfactory lubricating action. The mixtures according to the invention are particularly suitable for use in middle distillates. The term middle distillates is taken to mean, in particular, mineral oils boiling in the range from 120 to 450° C., and obtained by distillation of crude oil. Examples include kerosene, jet fuel, diesel and heating oil. The copolymer mixtures according to the invention are preferably used in middle distillates containing 0.5% by weight or less of sulfur, in particular less than 200 ppm of sulfur and in special cases less than 50 ppm of sulfur. These are generally middle distillates which have been hydrotreated and therefore contain only small proportions of polyaromatic and polar compounds which give them a natural lubricating action. The mixtures according to the invention are furthermore preferably used in middle distillates having 95% distillation points of below 370° C., in particular below 350° C. and in special cases below 330° C.

The mixtures can be used alone or together with other additives, for example with other pour point depressants or dewaxing auxiliaries, with corrosion inhibitors, antioxidants, detergent additives, sludge inhibitors, dehazers and additives for lowering the cloud point.

The effectiveness of the polymers according to the invention as lubricity improvers is explained in greater detail by means of the examples below.

EXAMPLES

Characterization of the Additives Employed

The vinyl acetate content is determined by polyrolysis of the polymer. To this end, 100 mg of the polymer are pyrolyzed for 5 minutes at 450° C. in vacuo in a closed system in a pyrolysis flask with 200 mg of pure polyethylene, and the pyrolysis gases are collected in a 250 ml round-bottom flask. The pyrolysis product acetic acid is reacted with an NaI/KIO$_3$ solution, and the iodine liberated is titrated with Na$_2$S$_2$O$_3$ solution. The comonomer contents are given in % by weight.

The hydroxy-functional comonomers are determined by measuring the OH number by reacting the polymer with excess acetic anhydride and then titrating the acetic acid formed with KOH.

The viscosity is determined in accordance with ISO 3219 (B) using a rotational viscometer (Haake RV 20) with a plate-and-cone measurement system at 140° C.

TABLE 1

Characterization of the additives A employed

| Example No. | Vinyl ester | OH Monomer | V$_{140}$ [mPas] | OH No. |
|---|---|---|---|---|
| A1 | 22% Vinyl acetate | 10% HEMA | 97 | 43 |
| A2 | 22% Vinyl acetate | 6% HEMA | 77 | 28 |
| A3 | 28% Vinyl acetate | 8% HEMA | 171 | 38 |
| A4 | 25% Vinyl acetate | 5% DMVC | 101 | 24 |
| A5 | 28% VeoVa 10 | 9% HEMA | 96 | 37 |

HEMA = Hydroxyethyl methacrylate
DMVC = Dimethylvinylcarbinol
VEOVA 10 = Vinyl neodecanoate

TABLE 2

Characterization of the additives B employed

| Example No. | Vinyl ester | V$_{140}$ [mPas] |
|---|---|---|
| B1 | 32% Vinyl acetate | 140 |
| B2 | 31% Vinyl acetate + 8% vinyl neodecanoate | 125 |
| B3 | 30% Vinyl acetate + 3% 4-methyl-1-pentene | 179 |
| B4 | Mixture of equal parts of B1 and B2 | 130 |

TABLE 3

Characterization of the test oils
The boiling data are determined in accordance with ASTM D-86, the CFPP value is determined in accordance with EN 116, and the cloud point is determined in accordance with ISO 3015.

| | Test oil 1 | Test oil 2 | Test oil 3 | Test oil 4 |
|---|---|---|---|---|
| Start of boiling [° C.] | 198 | 182 | 163 | 165 |
| 20% [° C.] | 246 | 202 | 201 | 209 |
| 30% [° C.] | 260 | 208 | 227 | 233 |
| 90% [° C.] | 339 | 286 | 305 | 335 |
| 95% [° C.] | 355 | 302 | 320 | 355 |
| Cloud Point [° C.] | −5 | −29 | 1 | −9.2 |
| CFPP [° C.] | −7 | −32 | −2 | −11 |
| S content [ppm] | 26 | 3 | 326 | 330 |
| Density [g/cm$^3$] | 0.832 | 0.819 | 0.841 | 0.851 |
| Wear scar [µm] | 564 | 609 | 571 | 598 |

Lubricating Action in Middle Distillates

The lubricating action of the additives was measured at 60° C. on oils containing the additives using a PCS Instruments high frequency reciprocating rig (HFRR). The HFRR test is described in D. Wei, H. Spikes, Wear, Vol. 111, No. 2, p.217, 1986. The results are given as coefficient of friction and wear scar. A low coefficient of friction and a low wear scar value indicate a good lubricating action.

TABLE 4

Wear scar in test oil 1

| Amount of A added | Amount of B added | Wear scar | Film | Friction |
|---|---|---|---|---|
| 200 ppm A1 | — | 560 | 16% | 0.34 |
| 300 ppm A1 | — | 535 | 20% | 0.28 |
| 400 ppm A1 | — | 238 | 91% | 0.12 |
| — | 100 ppm B1 | 560 | 15% | 0.35 |
| — | 300 ppm B1 | 550 | 17% | 0.35 |
| 300 ppm A1 | 100 ppm B1 | 203 | 95% | 0.12 |
| 200 ppm A1 | 100 ppm B1 | 285 | 87% | 0.14 |
| 150 ppm A1 | 100 ppm B1 | 376 | 74% | 0.23 |
| 400 ppm A3 | — | 408 | 58% | 0.25 |
| 200 ppm A3 | 100 ppm B1 | 247 | 90% | 0.13 |
| — | 300 ppm B3 | 565 | 15% | 0.35 |
| 300 ppm A4 | — | 490 | 12% | 0.36 |
| 150 ppm A4 | 100 ppm B1 | 227 | 92% | 0.12 |

TABLE 5

Wear scar in test oil 2

| Amount of A added | Amount of B added | Wear scar | Film | Friction |
|---|---|---|---|---|
| 200 ppm A1 | — | 559 | 46% | 0.28 |
| 300 ppm A1 | — | 435 | 75% | 0.20 |

TABLE 5-continued

Wear scar in test oil 2

| Amount of A added | Amount of B added | Wear scar | Film | Friction |
|---|---|---|---|---|
| 400 ppm A1 | — | 280 | 90% | 0.17 |
| — | 100 ppm B1 | 595 | 20% | 0.42 |
| — | 300 ppm B1 | 580 | 25% | 0.40 |
| 200 ppm A1 | 100 ppm B1 | 350 | 82% | 0.17 |
| 100 ppm A1 | 100 ppm B1 | 443 | 66% | 0.19 |
| 800 ppm A5 | — | 371 | 69% | 0.20 |
| 600 ppm A5 | 100 ppm B1 | 346 | 82% | 0.16 |

TABLE 6

Wear scar in test oil 3

| Amount of A2 added | Amount of B2 added | Wear scar | Film | Friction |
|---|---|---|---|---|
| 200 ppm | — | 320 | 83% | 0.15 |
| 200 ppm | — | 268 | 93% | 0.15 |
| — | 200 ppm | 565 | 31% | 0.22 |
| — | 300 ppm | 550 | 30% | 0.23 |
| 150 ppm | 150 ppm | 259 | 94% | 0.13 |
| 100 ppm | 100 ppm | 298 | 82% | 0.14 |
| 100 ppm | 200 ppm | 272 | 93% | 0.13 |
| 67 ppm | 133 ppm | 304 | 80% | 0.14 |
| 60 ppm | 240 ppm | 288 | 83% | 0.14 |

TABLE 7

Wear scar in test oil 4

| Amount of A2 added | Amount of B4 added | Wear scar | Film | Friction |
|---|---|---|---|---|
| — | 400 ppm | 470 | 48% | 0.16 |
| 400 ppm | — | 310 | 89% | 0.16 |
| 100 ppm | 300 ppm | 278 | 92% | 0.15 |
| 200 ppm | 200 ppm | 265 | 93% | 0.15 |
| 100 ppm | 200 ppm | 305 | 82% | 0.17 |

List of Trade Names Used

| Solvent naphtha ® Shellsol AB ® Solvesso 150 | aromatic solvent mixtures having a boiling range of from 180 to 210° C. |
|---|---|
| ® Solvesso 200 | aromatic solvent mixture having a boiling range of from 230 to 287° C. |
| ® Exxsol | Dearomatized solvent in various boiling ranges, for example ® Exxsol D60: 187 to 215° C. |
| ® ISOPAR (Exxon) | isoparaffinic solvent mixtures in various boiling ranges, for example ® ISOPAR L: 190 to 210° C. |
| ® Shellsol D | principally aliphatic solvent mixtures in various boiling ranges |

What is claimed is:

1. A mixture comprising
   A) from 10 to 90% by weight of at least one copolymer comprising structural units derived from ethylene and structural units derived from olefinically unsaturated, hydroxyl-containing compounds, and
   B) from 90 to 10% by weight of at least one copolymer comprising structural units derived from ethylene and structural units derived from vinyl esters, olefinically unsaturated ethers or (meth)acrylates,
wherein copolymers A) and B) have melt viscosities, independently of one another of less than 10,000 mPas.

2. The mixture as claimed in claim 1, wherein component A) comprises an olefinically unsaturated comonomer of formula 1

$$CH_2=CH-OCOR^1 \quad (1)$$

in which $R^1$ is $C_1-C_{30}$-hydroxyalkyl or $C_6-C_{30}$-hydroxyaryl.

3. The mixture as claimed in claim 1, wherein component A) comprises an olefinically unsaturated comonomer of formula 2

$$CH_2=CR^2-COOR^3 \quad (2)$$

in which $R^2$ is hydrogen or methyl, and $R^3$ is $C_1-C_{30}$-hydroxyalkyl.

4. The mixture as claimed in claim 1, wherein component A) comprises an olefinically unsaturated comonomer of formula 3

$$CH_2=CH-OR^4 \quad (3)$$

in which $R^4$ is $C_1-C_{30}$-hydroxyalkyl.

5. The mixture as claimed in claim 1, wherein component A) comprises a hydroxyalkene having 3 to 30 carbon atoms.

6. The mixture as claimed in claim 1, wherein the molar proportion of the hydroxyl-containing compounds in the copolymer A) is from 0.5 to 15%.

7. The mixture as claimed in claim 1, wherein the number of OH groups per molecule of the copolymer A) is between 1 and 500.

8. The mixture as claimed in claim 1, wherein the melt viscosities of the copolymers A) and B) are from 10 to 1000 mPas.

9. The mixture as claimed in claim 1, wherein the copolymers B) comprise structural units derived from compounds of formula 4

$$CH_2=CH-OCOR^1 \quad (4)$$

in which $R^1$ is $C_1-C_{30}$-alkyl.

10. The mixture as claimed in claim 1, wherein the copolymers B) comprise structural units derived from compounds of formula (5)

$$CH_2=CR^2-COOR^3 \quad (5)$$

in which $R^2$ is hydrogen or methyl, and $R^3$ is $C_1-C_{30}$-alkyl.

11. The mixture as claimed in claim 1, wherein the copolymers B) comprise structural units derived from compounds of formula (6)

$$CH_2=CH-OR^4 \quad (6)$$

in which $R^4$ is $C_1-C_{30}$-alkyl.

12. A fuel oil comprising middle distillates containing a maximum of 0.5% by weight of sulfur and a mixture as claimed in claim 1.

13. A process for the preparation of mineral oils and mineral oil distillates having an improved lubricating action, comprising adding a mixture as claimed in claim 1 to oils.

14. The mixture as claimed in claim 2, wherein $R^1$ of the formula 1 is $C_1-C_{16}$-hydroxyalkyl.

15. The mixture as claimed in claim 14, wherein $R^1$ of the formula 1 is $C_2-C_{12}$-hydroxyalkyl.

16. The mixture as claimed in claim 2, wherein the comonomer of the formula 1 is 2-hydroxyethyl vinyl ester, 2-hydroxypropyl vinyl ester, 3-hydroxypropyl vinyl ester or 4-hydroxybutyl vinyl ester.

17. The mixture as claimed in claim 3, wherein $R^3$ of the formula 2 is $C_1-C_{16}$-hydroxyalkyl.

18. The mixture as claimed in claim 17, wherein $R^3$ of the formula 2 is $C_2$–$C_{12}$-hydroxyalkyl.

19. The mixture as claimed in claim 3, wherein the comonomer of the formula 2 is hydroxyethyl acrylate, 2-hydroxypropyl acrylate, 3-hydroxypropyl acrylate, hydroxyisopropyl acrylate, 4-hydroxybutyl acrylate, glycerol monoacrylate or a corresponding ester of methacrylic acid.

20. The mixture as claimed in claim 4, wherein $R^4$ of the formula 3 is $C_1$–$C_{16}$-hydroxyalkyl.

21. The mixture as claimed in claim 20, wherein $R^4$ of the formula 3 is $C_2$–$C_{12}$-hydroxyalkyl.

22. The mixture as claimed in claim 4, wherein the comonomer of the formula 3 is 2-hydroxyethyl vinyl ether, hydroxypropyl vinyl ether, hexanediol monovinyl ether, 4-hydroxybutyl vinyl ether, diethylene glycol monovinyl ether, diethylene glycol monovinyl ether or cyclohexanedimethanol monovinyl ether.

23. The mixture as claimed in claim 1, wherein component A) comprises a hydroxyalkene having 4 to 16 carbon atoms.

24. The mixture as claimed in claim 23, wherein component A) comprises a hydroxyalkene having 5 to 12 carbon atoms.

25. The mixture as claimed in claim 1, wherein component A) comprises dimethylvinylcarbinol (=2-methyl-3-buten-2-ol), allyloxypropanediol, 2-butene-1,4-diol, 1-buten-3-ol, 3-buten-1-ol, 2-buten-1-ol, 1-penten-3-ol, 1-penten-4-ol, 2-methyl-3-buten-1-ol, 1-hexen-3-ol, 5-hexen-1-ol or 7-octene1,2-diol.

26. The mixture as claimed in claim 1, wherein the molar proportion of the hydroxyl-containing compounds in the copolymer A) is from 1 to 12%.

27. The mixture as claimed in claim 9, wherein $R^1$ of the formula 4 is $C_1$–$C_{16}$-alkyl.

28. The mixture as claimed in claim 27, wherein $R^1$ of the formula 4 is $C_1$–$C_{12}$-alkyl.

29. The mixture as claimed in claim 10, wherein $R^3$ of the formula 5 is $C_1$–$C_{16}$-alkyl.

30. The mixture as claimed in claim 29, wherein $R^3$ of the formula 5 is $C_1$–$C_{12}$-alkyl.

31. The mixture as claimed in claim 11, wherein $R^4$ of the formula 6 is $C_1$–$C_{16}$-alkyl.

32. The mixture as claimed in claim 31, wherein $R^4$ of the formula 6 is $C_1$–$C_{12}$-alkyl.

* * * * *